No. 741,690. PATENTED OCT. 20, 1903.
O. M. R. MÖLLER.
WATER PURIFIER.
APPLICATION FILED JAN. 27, 1903.
NO MODEL. 2 SHEETS—SHEET 1.

Fig. 1.

No. 741,690. PATENTED OCT. 20, 1903.
O. M. R. MÖLLER.
WATER PURIFIER.
APPLICATION FILED JAN. 27, 1903.
NO MODEL. 2 SHEETS—SHEET 2.
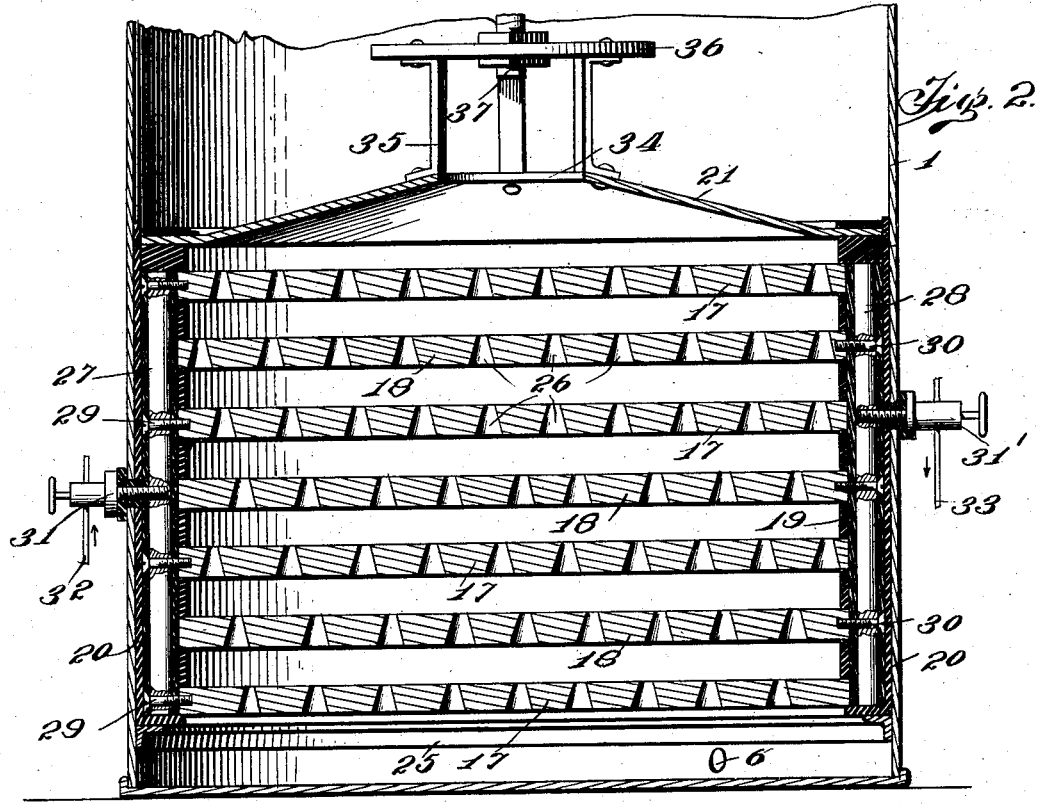
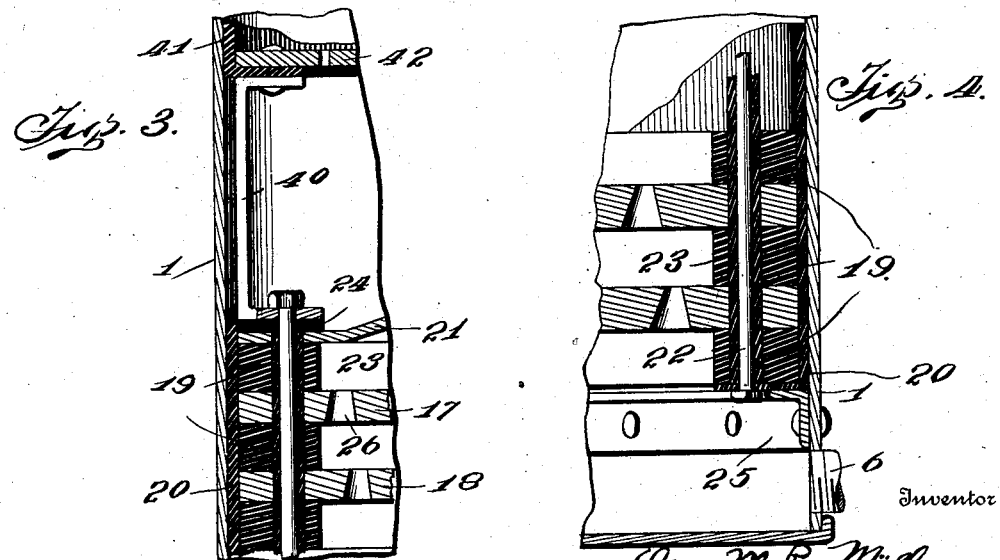

No. 741,690. Patented October 20, 1903.

UNITED STATES PATENT OFFICE.

OSCAR M. R. MÖLLER, OF COPENHAGEN, DENMARK.

WATER-PURIFIER.

SPECIFICATION forming part of Letters Patent No. 741,690, dated October 20, 1903.

Application filed January 27, 1903. Serial No. 140,724. (No model.)

*To all whom it may concern:*

Be it known that I, OSCAR M. R. MÖLLER, a subject of the King of Denmark, residing at Copenhagen, in the Kingdom of Denmark, have invented certain new and useful Improvements in Water-Purifiers; and I do hereby declare the following to be a full, clear, and exact description of the invention, such as will enable others skilled in the art to which it appertains to make and use the same.

This invention relates to improvements in mechanism for purifying liquids, and more particularly water, the mechanism being so constructed as to utilize the principle that ozone is produced to some extent by the electrolysis of water.

It consists in a closure into which the liquid or water to be purified can be introduced at the bottom and forced to pass through said closure and a series of poles connected with a source of electrical energy, so that the electrical current can be passed through the liquid from one set of poles to the other, so as to decompose some of the liquid or water, liberating thereby oxygen and hydrogen, a small quantity of ozone also being produced at the same time.

It further consists in providing a closure with the poles of a battery or other source of electrical energy and bringing water into contact therewith for effecting the electrolysis of portions of the water and mounted within the closure retarding means for causing a thorough intermingling of the gases produced by the electrolytic action of the current, so that the ozone can perfectly purify the water and so that the other gases generated can combine with ingredients in the water and further purify and cleanse the same.

It also consists in certain other novel constructions, combinations, and arrangements of parts, as will be hereinafter fully described and claimed.

In the accompanying drawings, Figure 1 is a view, partly in elevation and partly in section, of my improved apparatus for purifying water and other liquids. Fig. 2 is an enlarged central section through the lower portion of said apparatus, illustrating the manner of electrically connecting the poles which are in the bottom of the purifier with a battery or other source of electricity. Figs. 3 and 4 are detail sectional views illustrating the manner of thoroughly insulating the poles or electrodes arranged within the purifier.

It is known that the electrolysis of water produces a certain amount of ozone, which is capable of destroying germs and other organic matters, so as to thoroughly disinfect and purify water or surrounding conditions. This invention is designed to make it possible to apply this chemical action to water for ordinary use, so that the said water can be thoroughly cleaned and purified, the purification of the water being accomplished by merely passing the same through the apparatus forming the subject of the present invention.

In developing the invention in a practical form a suitable closure, as 1, is employed, which may be a cylindrical vessel provided with a removable top 2, so that it can be opened at its upper end. The top 2 is preferably capable of being tightly clamped in position to make an air-tight and gas-tight joint, said top being clamped or bolted to the upper end of the cylinder, with a suitable packing, as 3, interposed between the said top 2 and a flange 4, formed at the upper edge of the receptacle 1. A liquid-supply pipe 5 leads to a suitable point near the upper part of the tank or receptacle 1 and is connected to the bottom of the tank by a branch pipe 6, which enters the tank just above its bottom wall or floor. A second branch pipe 7 leads from the pipe 5 to a valve 8, which valve is formed with a connection 9, entering the top of the tank 1, and also with a pipe 10, leading to another suitable place for delivering the water or liquid purified. The cock or valve 8 is preferably a three-way valve, which may be moved to shut off the pipe 7 and connect the pipes 9 and 10 or may be turned so as to connect pipes 7 and 9, feeding the water in at the top of the receptacle 1 when it is desired to reverse its direction through the same for cleaning or other purpose. A three-way cock or valve 11 is also interposed between the pipe 5 and the branches 6 and 7, so that the water or liquid may be caused to flow through either one branch or the other, as desired. An outlet-pipe 12 is also arranged at the bottom of the tank controlled by a two-way or single valve 13. The valves 8, 11, and 13 may be connected by roding 14 and 15, pivotally secured to the levers on the stems of said valves, so that by turning one valve all are operated simultaneously. An operating-lever 16 is preferably secured to the stem of the valve 11 for this purpose. It will be seen that by moving the lever 16 to the position shown in Fig. 1 the liquid will be permitted to flow through the pipe 5 and through the branch 6 into the bottom of the tank 1 and will be cut off from the pipe 7, while at the same time the valve 13 will be closed, so that the water will have to pass upwardly through the tank 1 and out through the pipe 9, the valve 8 being in position to deliver the said water to the outlet-pipe 10. When it is desired to wash the interior of the tank 1 by reversing the current of water through the same, the lever 16 is raised, which will cut off the branch pipe 6 from the pipe 5, directing the flow of water through the branch 7. The valve 8 will then be in position to direct the water through the pipe 9 into the top of the tank 1, and the valve 13 will also be simultaneously moved to a position to permit the water to flow out from the bottom of the tank 1 through the outlet-pipe 12.

In order to produce an electrolysis of the water or liquid passed through the tank 1, a device is arranged in the bottom of the tank, which is made up of a number of plates 17 and 18, which form the poles or electrodes for the electric current which is to be passed through the liquid in the tank. These plates are mounted one above the other and are separated from each other by blocks of insulating material, such as rubber or the like, (designated by the numeral 19 in the drawings.) The edges of these plates are insulated from the walls of the tank 1 by a sleeve or cylinder 20, of insulating material, which incloses said plates. The plates are bound together and to a lifting-disk or collecting-diaphragm 21, mounted at the top of the structure, by means of bolts 22. The bolts 22 are thoroughly insulated from the plates 17 and 18 by using insulating-sleeves 23, which inclose the bolts, said sleeve passing through the bolt-holes in the said plates. A washer of insulating material, as 24, is interposed between the ends of the bolts 22 and the diaphragm 21. In this manner the plates are not only bound together, but are securely fastened to the diaphragm 21, so that they may be lifted thereby, and yet every plate is thoroughly insulated from the others within the structure. While the plates and their surrounding sleeve 20 are made to fit very snugly in the tank 1, yet the whole structure is sufficiently loose within the tank to be raised and lowered therein. The plate structure just described is supported above the pipes entering the bottom of the tank by an annular ledge or angle-iron 25, secured to the walls of the tank near the bottom thereof. The plates 17 and 18 are preferably formed with many apertures or perforations, as 26, so that liquids entering at the bottom of the tank 1 and passing upwardly therein will find their way through the apertures 26 without difficulty, and yet will be brought thoroughly in contact with the said plates and will be thoroughly affected by electrical currents passing through such plates. The plates 17 and 18 are connected with a battery or other source of electricity by means of pole-pieces 27 and 28. The plates 17 and 18 are alternately arranged, and every other plate, as 17, is connected, by means of screws 29, with the pole-piece 27, while the other alternate plates 18 are connected by screws or bolts 30 with the pole-pieces 28. The pole-pieces 27 and 28 are each provided with a binding-post 31 and 31', which is screwed into the said pole-pieces, the screw portion of each binding-post passing through the apertures in the wall of the tank 1 and through the insulation and the pole-pieces of the plates 17 and 18. Wires 32 and 33 are connected with the binding-posts 31 and 31' for electrically connecting the plates with the battery or other suitable source of electrical energy, such source not being illustrated in the drawings. It will be seen that when there is no liquid in the tank 1 and a battery or other source of electrical energy is connected with the pole-pieces 27 and 28 and the plates 17 and 18 no current can pass through the device because of the thorough insulation of the plates from each other. If, however, a liquid, as water, be permitted to pass upwardly through the tank, so as to fill the spaces between the plates, and the current pass from one set of plates—as, for instance, 17—to the other set of plates 18, an electrolytic action will be had upon the said water or liquid.

The diaphragm 21 is preferably slightly conical in shape and is formed with a central aperture 34. Around the aperture 34 are a number of standards 35, which extend upwardly and connect the said diaphragm 21 with a plate 36. The plate 36 is carried by the lower end of an operating-rod 37, which passes thence upwardly through the tank 1 and through a packing-gland 38 in the top plate 2. The other end of the operating-rod 37 is provided with a handle 39, by which said rod can be moved up and down. The diaphragm 21 thus not only connects the pole-plates 17 and 18 with the operating-rod 37 and the handle 39, but acts as a collector of the gases generated by the electrolytic action upon the liquids in the bottom of the tank 1, causing all the water and gases to collect and pass through the opening 34 and upwardly beneath the plate 36 to reach the upper part of the tank 1. In this manner the ozone, oxygen, and hydrogen are thoroughly commingled with every portion of the liquid and act upon any foreign substances which it may carry. To further insure the thorough action of these gases upon the liquid, retarding materials—such as crushed quartz, broken glass, sand, and the like—are suitably supported in the upper portion of the tank 1. To carry these materials, standards 40 rise from the top of the diaphragm 21 and the insulating-washer 24 thereon a suitable distance and support a shell 41 at their upper ends, which shell, if desired, may be made of insulating material. This shell carries a series of diaphragms or plates 42, arranged one above the other at suitable intervals to form spaces or receptacles between them. These plates 42 are perforated, so that the water and gas may pass through them. Crushed quartz, broken glass, sand, and the like are arranged in these compartments and retard the passage of the gas through the tank, so that they are further brought intimately into contact with every portion of the water. A preferable arrangement of these retarding materials is that shown in Fig. 1 of the drawings, where crushed quartz, as 43, is placed in the lower receptacle formed between the plates 42, the quartz not being sufficiently small to pass through the apertures in the lower plate 42. Finer material, such as broken glass, as 44, is placed in the second compartment, while in the upper compartment still finer material, as sand 45, may be located. It will be seen that the structure 41 is supported upon the pole structure at the bottom of the tank and can be lifted in the tank only by raising the rod 37. To prevent the movement of the series of plates 42 with respect to the rod 37, a cotter pin or key 46 may be passed through an aperture in the rod 37 immediately above the upper plate 42, a washer 46ª being interposed between said pin and plate, as illustrated in Fig. 1. It will now be seen that water introduced into the tank at the bottom thereof will pass upwardly through the pole-plates 17 and 18, where ozone, oxygen, and other gases will be liberated. The water and gases will then be collected by the diaphragm 21 and forced to pass through the aperture 34, after which they may spread again and will be forced to pass through the materials between the plates 42; but the water in its purified and palatable condition will be permitted to pass upwardly through the pipe 10.

When it is desired to clean out any impurities which may have collected within the apparatus, the valves are operated as above described, so as to cut off the flow of water through the branch pipe 6, and the water will then be driven through the apparatus from the top, entering at the pipe 9 and passing out at the pipe 12. The shape of the diaphragm 21 is such that sediment and foreign substances will more or less collect upon the upper side thereof. A branch pipe 47 leads from a point in the tank 1 just above the diaphragm 21 when in its lowest position to the outlet-pipe 12 inside the valve 13—that is to say, between it and the tank 1—so that when the washing action is taking place the water flowing downwardly through the tank 1 will tend to wash the sediment collected upon the diaphragm 21 through the pipe 47 into the discharge-pipe 12. In order to increase the cleansing operation in the apparatus, the pole-plates 17 and 18 and the retarding structure above can be reciprocated by means of the rod 37 and the handle 39, the whole structure within the tank 1 being thus moved back and forth through the water. Before attempting to move the pole-plates the binding-posts 31 and 31' are unscrewed, so that the structure will be free to move up and down in the casing. In this way all clinging particles of foreign or impure substances can be thoroughly freed and caused to be washed out.

An apparatus of this kind is found to be extremely effective for purifying water, since the electrolysis of water by the action of the electrical current on the pole-plates 17 and 18 tends to liberate oxygen and hydrogen, producing, as is well known, at the same time some ozone, which is very effective in killing and eliminating germs and other organic matters. The hydrogen also attacks any chlorates or chlorids which may be in the liquid, and the electric current also tends to break up any carbonates, oxids, or chlorids into their cathion and anion constituents. The use of the retarding apparatus, including the diaphragm 21 and the broken materials above, tends to concentrate the action of the ozone and gases upon every portion of the liquid, and the broken quartz, glass, sand, &c., also tend to retard foreign matters that cannot be broken up by the gases.

Altogether the apparatus is exceedingly simple, very efficient for the purification of water or liquids, and yet can be thoroughly and quickly cleaned from time to time, as above described.

Having thus fully described my invention, what I claim as new, and desire to secure by Letters Patent, is—

1. A liquid-purifier, comprising a casing, electrodes movably mounted therein, and means for reciprocating the said electrodes in the casing, substantially as described.

2. A liquid-purifier comprising a casing, a series of electrodes mounted in said casing and capable of movement within the same, means for reciprocating the electrodes within the casing, and means for passing the liquid to be acted upon through the casing and the electrodes, substantially as described.

3. A liquid-purifier comprising a casing, a series of perforated plates forming electrodes, the said plates being secured with respect to each other but capable of movement in the casing, means for reciprocating the said plates in the said casing, and means for passing a liquid to be purified through said plates and through the casing, substantially as described.

4. A purifier for liquids comprising a casing, a series of electrodes, plates built up one upon the other, means for securing them together, means for moving the group of plates back and forth within the casing, and means for passing liquid through the casing and plates for submitting the same to the purifying action of an electric current, substantially as described.

5. A water-purifier comprising a casing and means for passing water through the same, mechanism mounted in the bottom of the casing for subjecting water to the action of electrolysis, and converging means above said mechanism for collecting the ozone and other gases produced thereby and forcing them through a small aperture and thus into thorough contact with every portion of the water passing through the casing to purify the same, substantially as described.

6. A water-purifier comprising a closure and means for passing water through the same, a series of electrodes mounted so as to be capable of movement within the casing and means for passing an electric current to the same, a diaphragm for collecting and concentrating the gases liberated by the electrolysis of the water so that they will be thoroughly commingled and the gases will have a chance to purify the water, substantially as described.

7. A mechanism for purifying water comprising a closure, means for directing a flow of water through the same, a series of electrodes made up of perforated plates built up one above the other, and capable of movement in the casing, insulating material for spacing the plates apart, means for insulating the plates from the casing, pole-pieces mounted in said insulation, means connecting the pole-pieces with alternate plates forming two groups of electrodes, binding-posts connected with said pole-pieces, and conductors connecting said binding-posts with any suitable source of electricity said groups of plates thus connected causing a current to pass through the water when the water fills the space between the plates, substantially as described.

8. A water-purifier comprising a closure, a series of poles or electrodes mounted therein, a converging tapering diaphragm above the said poles having an aperture formed therein, and means for passing an electric current through the poles when the water fills the space between them for generating gases, the said water and gases being forced in passing through said aperture into intimate relation with each other so that every portion of the water may be acted upon by purifying influences, substantially as described.

9. A water-purifier comprising a closure and means for passing water through the same, electrically-connected pole-pieces in the said closure for producing the electrolysis of some of the water, and a mechanism mounted above the said pole-pieces for retarding and thoroughly intermixing the gases generated by the process of electrolysis to insure a thorough purifying of all the water passing through the closure, substantially as described.

10. A water-purifier comprising a casing, movable electrodes mounted therein, means for passing water between and through the same for subjecting the water to the process of electrolysis, and means for reversing the water through the plates and casing to clean it from time to time together with means for reciprocating the plates within the casing to assist in such cleansing, substantially as described.

11. A water-purifier comprising a casing, movable electrodes mounted in the casing, retarding means mounted in the casing and connected with the movable electrodes so as to be moved therewith, and means for reversing the current of water through the casing for cleansing the same together with means for reciprocating the electrodes and retarding means to further facilitate the cleansing operation, substantially as described.

12. A water-purifier comprising a casing, means for directing a flow of water through the same, a series of electrodes mounted in the casing, a collecting-diaphragm connected with said electrodes and capable of lifting them, said diaphragm having a central aperture, a plate above the aperture of the diaphragm for spreading the water after passing through said aperture, and a stem connected with the said plate for lifting the electrodes whereby they may be vertically reciprocated in the casing for causing a thorough cleansing thereof, substantially as described.

13. A water-purifier comprising a closure, a series of electrodes mounted within the same, a retarding mechanism in the casing and carried above the electrodes comprising a series of perforated diaphragms or plates suitably spaced apart to form compartments between them, crushed and broken material of various degrees of fineness placed in said compartments for retarding the movement of water through the casing and causing the same to be thoroughly intermingled with gases produced by the electrolysis of water, and means of applying an electric current to the electrodes for producing said electrolysis, substantially as described.

14. A water-purifier comprising a closure, a movable electrode structure in the lower portion of the casing, standards rising from the same, a retarding structure mounted upon said standards comprising a casing and perforated diaphragms spaced apart so as to form compartments, crushed quartz, glass or sand arranged in said compartments, means for passing water through the structure, and means for applying an electric current to the electrodes, the ozone and other gases attendant upon the electrolysis of water being retarded and thoroughly commingled with the water passing through the apparatus for purifying the same, substantially as described.

15. A water-purifying mechanism comprising a casing, piping leading to the upper and lower portion thereof, valves controlling the flow of water through said piping so that it may be introduced at either end of the closure, valves controlling the said piping, and an outlet-pipe at the lower end thereof, and means for moving the valves simultaneously so that the water will be directed either upwardly or downwardly through the said apertures, the upward movement of the water being attendant with the purifying action upon the water while the downward movement is attended by the purifying or cleansing action upon the apparatus, substantially as described.

16. A water-purifier comprising a casing, a group of electrodes mounted therein, a diaphragm mounted above the electrodes having an aperture through which the water is forced to pass, a branch pipe leading from the wall of the casing just above the diaphragm to an outlet at the bottom of the casing, and means for reversing the flow of water through the casing whereby sediment collected by the diaphragm will be washed from the upper surface thereof, through the branch pipe out of the apparatus, substantially as described.

17. A water-purifier comprising a casing, a group of electrodes mounted in the lower portion thereof, means for lifting said electrodes passing through the top of the casing, a movable retarding mechanism above the electrodes and carried thereby, means for directing water upwardly through the casing for purifying the same, and means for directing the water downwardly through the casing for purifying the apparatus, the cleansing operation upon the apparatus being further facilitated by reciprocating the electrodes and retarding mechanism, substantially as described.

In testimony whereof I hereunto affix my signature in presence of two witnesses.

OSCAR M. R. MÖLLER.

Witnesses:
HANNIBAL DUCH,
A. M. LEE.